US009878918B2

(12) United States Patent
Wonder

(10) Patent No.: US 9,878,918 B2
(45) Date of Patent: Jan. 30, 2018

(54) PRODUCT COMPRISING ALUMINUM CHLOROHYDRATE PARTICLES HAVING SPECIFIC BASICITY

(71) Applicant: USALCO, LLC, Baltimore, MD (US)

(72) Inventor: Bruce Wonder, Abingdon, MD (US)

(73) Assignee: USALCO, LLC, Baltimore, MD (US)

( * ) Notice: Subject to any disclaimer, the term of this patent is extended or adjusted under 35 U.S.C. 154(b) by 0 days.

(21) Appl. No.: 15/455,669

(22) Filed: Mar. 10, 2017

(65) Prior Publication Data

US 2017/0183238 A1    Jun. 29, 2017

Related U.S. Application Data

(63) Continuation of application No. 14/852,458, filed on Sep. 11, 2015.

(60) Provisional application No. 62/049,457, filed on Sep. 12, 2014.

(51) Int. Cl.
*B32B 5/16* (2006.01)
*C01F 7/56* (2006.01)
*B07B 7/086* (2006.01)

(52) U.S. Cl.
CPC ........... *C01F 7/56* (2013.01); *B07B 7/086* (2013.01); *C01P 2004/03* (2013.01); *C01P 2004/61* (2013.01); *C01P 2006/10* (2013.01); *C01P 2006/12* (2013.01); *C01P 2006/90* (2013.01)

(58) Field of Classification Search
CPC ...... C01F 7/02; C01F 7/23; C01F 7/56; C01P 2004/61; C01P 2004/80; C01P 2006/11; C01P 2006/12; C01P 2006/20029; C01P 2006/90

USPC .......................................................... 423/495
See application file for complete search history.

(56) References Cited

U.S. PATENT DOCUMENTS

| 2,470,315 A | 5/1949 | McGehee ........................ 241/54 |
| 2,671,009 A | 3/1954 | Comstock ........................ 23/90 |
| 3,462,086 A | 8/1969 | Bertrand et al. ................. 241/5 |
| 3,876,758 A | 4/1975 | Beekman ......................... 424/47 |

(Continued)

FOREIGN PATENT DOCUMENTS

| CN | 102607248 A | 7/2012 | .............. F26B 17/10 |
| DE | 273824 A1 | 11/1989 | ................ C01F 7/30 |

(Continued)

OTHER PUBLICATIONS

Hartman et al., Thermal Decomopsition of Aluminum chloride Hexahydrate, Ind. Eng. Chem. Res. 2005, 44, 6591-6598.*

(Continued)

*Primary Examiner* — Holly Le
(74) *Attorney, Agent, or Firm* — Sunstein Kann Murphy & Timbers LLP

(57) ABSTRACT

Aluminum chlorohydrate products include particles of aluminum chlorohydrate, in fractured crystal form, the particles having a basicity in the range of about 50% to about 85.6%, a bulk density of 40 to 65 pounds per cubic foot, and a mean particle size in the range of about 10 microns to about 15 microns. The particles may also have a surface area to weight ratio of about 295 to about 705 $m^2/kg$, inclusive of both endpoints and all numerical values therebetween, where the ratio is measured by laser diffraction. Methods of producing such products are also disclosed.

8 Claims, 6 Drawing Sheets

(56) References Cited

U.S. PATENT DOCUMENTS

| | | | |
|---|---|---|---|
| 3,878,293 A * | 4/1975 | Piccolo | C01F 7/56 23/294 R |
| 3,891,745 A * | 6/1975 | Bellan | C01F 7/56 423/111 |
| 4,029,750 A * | 6/1977 | Schoener | C01F 7/58 423/495 |
| 4,090,916 A | 5/1978 | Papafingos et al. | 159/9 A |
| 4,390,131 A | 6/1983 | Pickrel | 241/1 |
| 5,167,372 A | 12/1992 | Poggie et al. | 241/23 |
| 5,573,582 A | 11/1996 | Inui et al. | 106/287.17 |
| 5,985,234 A | 11/1999 | Dulko | 423/467 |
| 5,997,838 A | 12/1999 | Dulko | 423/462 |
| 6,036,935 A | 3/2000 | Dulko | 423/462 |
| 6,145,765 A | 11/2000 | Capelle, Jr. et al. | 241/5 |
| 6,152,974 A | 11/2000 | Delpiano et al. | 44/593 |
| 9,611,155 B2 | 4/2017 | Dulko | 252/175 |
| 2004/0040178 A1 | 3/2004 | Coles et al. | 34/591 |
| 2007/0187256 A1 * | 8/2007 | Pratt | A61K 8/26 205/508 |
| 2008/0181840 A1 * | 7/2008 | Steelhammer | B01J 27/128 423/495 |
| 2014/0007455 A1 | 1/2014 | Backlund | 34/386 |
| 2016/0074873 A1 | 3/2016 | Wonder | |

FOREIGN PATENT DOCUMENTS

| | | | |
|---|---|---|---|
| EP | 0530598 A1 | 3/1993 | C01F 7/56 |
| GB | 576557 A | 4/1946 | |
| GB | 1266328 A | 3/1972 | B02C 21/00 |
| WO | WO 90/08738 A1 | 8/1990 | C01F 7/56 |
| WO | WO 01/97768 A2 | 12/2001 | A61K 7/34 |

OTHER PUBLICATIONS

Fisher Scientific, Aluminum Chloride Hexahydrate—Description (2 pages)—2008.*

Arvaniti et al., "Determination of particle size, surface area, and shape of supplementary cementitious materials by different techniques," Material and Structures, 15 pages, Oct. 4, 2014.

Frias et al., "Determination of Specific Surface Area by the Laser Diffraction Technique. Comparison with the Blaine Permeability Method," Cement and Concrete Research, vol. 21, No. 5, pp. 709-717, 1991.

Harrigan, "Measuring Cement Particle Size and Surface Area by Laser Diffraction," Research Results Digest 382, National Cooperative Highway Research Program, Transportation Research Board of the National Academies, 24 pages, Apr. 2013.

Horiba Instruments, Inc., A Guidebook to Particle Size Analysis, Horiba Scientific, 32 pages, 2012.

ISO, Particle size analysis—Laser diffraction methods, International Standard, ISO 13320, 57 pages, 2009.

Malvern Instruments Limited, A basic guide to particle characterization, Whitepaper, Malvern, 24 pages, 2015.

Malvern Instruments Limited, Mastersizer 3000, User Manual, Malvern, MAN0474-06-EN-00, 196 pages, Jun. 2015.

Malvern Instruments Limited, Mastersizer 3000, Smarter Particle Sizing, Malvern, 20 pages.

Tzoupanos et al., "Coagulation-flocculation processes in water/wastewater treatment: the application of new generation of chemical reagents," 6th IASME/WSEAS International Conference on Heat Transfer, Thermal Engineering and Environment, Rhodes, Greece, pp. 309-317, Aug. 20-22, 2008.

Yang et al., Characteristics of High-purity Polyaluminum Chloride Species Prepared by Homogenous Alkalization, Natural Science Journal of Xiangtan University, vol. 27, No. 4, pp. 68-72, Jan. 1, 2005 (In Chinese).

Yang et al., Characteristics of High-purity Polyaluminum Chloride Species Prepared by Homogenous Alkalization, Natural Science Journal of Xiangtan University, vol. 27, No. 4, 4 pages, 2005 (English Abstract).

International Searching Authority, International Search Report—International Application No. PCT/US2015/049839, dated May 30, 2016, together with the Written Opinion of the International Searching Authority, 24 pages.

International Preliminary Examining Authority, International Preliminary Report on Patentability—International Application No. PCT/US2015/049839 dated Jan. 30, 2017, 27 pages.

* cited by examiner

US 9,878,918 B2

PRODUCT COMPRISING ALUMINUM CHLOROHYDRATE PARTICLES HAVING SPECIFIC BASICITY

CROSS REFERENCE TO RELATED APPLICATIONS

This patent application is a continuation application of U.S. patent application Ser. No. 14/852,458 filed on Sep. 11, 2015, which claims the benefit of U.S. Provisional Patent Application No. 62/049,457 filed Sep. 12, 2014, the disclosures of which are incorporated by reference herein in their entirety.

TECHNICAL FIELD

The present invention relates to the production of a family of dry aluminum chloride products ranging from zero percent basic, aluminum chloride hexahydrate (HEX), to 85.6 percent basic, aluminum chlorohydrate (ACH) using non-elemental sources of raw materials through the use of an improved process of treating HEX to produce dry aluminum chloride products of specific basicity.

BACKGROUND

In the aluminum chloride market there is a demand for products ranging from solutions that contain free hydrochloric acid to products, both liquid and dry, of increasing levels of basicity. Aluminum chloride has the general chemical formula of $Al_n(OH)_mCl_{3n-m}$. Basicity is defined as the ratio of $$\frac{m}{3n}$$

where m is less than or equal to 5.2.

It is undesirable to use elemental aluminum as the source of aluminum to produce these products due to the controlled availability and volatility of pricing of the metal on the commodity market. Sources of aluminum such as aluminum ore (bauxite), refined aluminum ore (aluminum trihydrate (ATH)) or various pre-solubilized forms are more desirable because of their availability and relatively stable pricing.

Production of high basicity products starting with aluminum from non-metallic sources requires rapidly increasing amounts of energy as basicity increases. In addition to the energy, the stability of the final product begins to decrease once the basicity ratio is greater than 0.3. From this point (0.3 basicity ratio) up to a basicity ratio of 0.83 technology similar to that disclosed in U.S. Pat. No. 5,985,234 can be used, typically with aluminum metal as a starting material.

An alternate approach for increasing the basicity ratio is to remove chloride from the molecule rather than adding aluminum. Under this approach, a simple solution of aluminum chloride is produced using a non-elemental source of aluminum. It is known that solutions of aluminum chloride when concentrated beyond saturation form crystals of aluminum chloride hexahydrate and that these crystals, when exposed to heat, decompose, releasing hydrogen chloride and water. This approach has been applied to produce high purity aluminum oxide and, to a lesser extent, to produce basic aluminum chloride, but only in batching operations. A process that reduces the requirement of batching operations would result in increased efficiency of production, lower cost, and improved safety.

Several publications describe systems that utilize mills and rotational motion for dehydration and drying materials. See e.g., U.S. Pat. Nos. 6,145,765; 5,167,372; 4,390,131; 3,462,086; 2,470,315; and U.S. publication number 2004/0040178. These systems do not address issues associated with the stringent requirements, such as handling of evolved hydrochloric acid that must be addressed in the production of aluminum chloride products of specific basicity. In another approach, flash dryer systems involve spraying slurry onto a dryer and applying high temperature to evaporate gas and liquid components. See e.g., U.S. Pat. No. 5,573,582.

Evaporation, crystallization, and recovery of formed crystals are well known in the art. See for example, McCabe and Smith 1976, *Unit Operations of Chemical Engineering*, in particular, the following sections: *Evaporation*, pages 425-463 to 11-118, *Crystallization*, pages 852 to 894, and *Filtration*, pages 922 to 953; and Perry's *Chemical Engineering Handbook* (7th Ed. Perry and Green, 1999), sections: *Evaporation*, pages 11-107 to 11-118, *Crystallization*, pages 18-35 to 18-55, and *Filtration*, pages 18-74 to 18-125.

SUMMARY OF THE EMBODIMENTS

In one embodiment of the present invention, an aluminum chlorohydrate product includes particles of aluminum chlorohydrate, in fractured crystal form, having a basicity in a range of about 50% to about 85.6%, a bulk density of 40 to 65 pounds per cubic foot, and a mean particle size in the range of about 10 microns to about 15 microns.

In related embodiments, the particles of aluminum chlorohydrate may have a surface area to weight ratio of about 295 to about 705 $m^2/kg$ as measured by laser diffraction, inclusive of both endpoints and all numerical values therebetween. The particles may have a basicity of about 83% and a surface area to weight ratio in the range of about 575 to about 700 square meters per kilogram, as measured by laser diffraction. The fractured crystal particles may have a basicity of about 50%, about 60%, about 72%, about 83%, or about 85%.

Embodiments disclosed herein also include a method for producing aluminum chloride hexahydrate particles of a desired basicity that includes applying a high temperature gas stream to a circular mill to establish and maintain a circulating gas stream within the mill at a constant temperature. Aluminum chloride hexahydrate crystals are introduced into the heated circular mill, where the crystals are formed into aluminum chlorohydrate particles and separated based on particle density. The resulting particles having a basicity that is a function of the constant temperature, and are dried and collected as they exit the circular mill. In a related embodiment, constant temperature is in the range of 200° F. to 400° F. and the dried particles collected from the mill have a basicity range of about 50% to about 85.6%. In a further related embodiment, the constant temperature is in the range of 220° F. to 240° F. and dried particles comprise $Al_2Cl_6$ with a basicity of 0 to 5%.

In another related embodiment, the constant temperature is in the range of 260 to 280° F., and the particles comprise $Al_2(OH)Cl_5$ with a basicity of about 14 to 18%. In a further related embodiment, the constant temperature is about 300-310° F. and the dried particles comprise $Al_2(OH)_2Cl_4$ and have a basicity of about 31 to 35%.

In another related embodiment, the constant temperature is about 340-350° F. and the dried particles comprise $Al_2(OH)_3Cl_3$ and have a basicity of about 38 to 52%. In a further related embodiment, the constant temperature is about 350 to 360° F. and the dried particles comprise $Al_2(OH)_4Cl_2$ and have a basicity of about 64 to 68%. In yet another related embodiment, the constant temperature is about 380 to 400° F. and the dried particles comprise $Al_2(OH)_5Cl$ and have a basicity of about 81 to 85%.

In another related embodiment, the gas stream comprises ambient air and steam.

In yet another related embodiment, the dried particles have a bulk density of about 40 to about 65 pounds per cubic foot; and/or a surface area greater than about 300 square meters per kilogram and less than about 700 meters per kilogram; and or a surface area of greater than 500 square meters per kilogram and less than 600 meters per kilogram.

In an embodiment of the invention, there is provided a method for producing aluminum chloride hydrates of various basicity; the method includes applying a high temperature gas stream to a circular mill to maintain a constant temperature creating a heated circular stream; feeding a HEX particle into the circular mill, wherein the HEX particles begin to decompose forming particles of various basicities and densities; centrifugal forces inside the circular mill cause the particles to separate based on particle density; varying feed rate to maintain a constant exit temperature; and collecting dried particles as the particles exit the circular mill.

Embodiments of the invention also include aluminum chlorohydrate particles produced by the methods described herein and/or with one or more particle properties described herein, including basicity in the range of 0% to about 85.6%; surface area to weight ratio of about 295 to about 705 $m^2$/kg; and a bulk density of about 40 to 65 pounds per cubic foot.

The aluminum chloride products described herein are produced efficiently using methods and systems that greatly reduce the energy required to prepare aluminum chloride products having a desired basicity, and therefore a corresponding reduction of production costs.

Embodiments of the invention also include methods for utilizing the aluminum chlorohydrate particles described herein in applications such as waste water treatment, manufacture of catalyst support systems, and other applications of aluminum chloride products.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

Polyaluminum Chlorides: Polyaluminum chlorides are products of aluminum chloride hydroxide, $AlCl(OH)_2$, $AlCl_2(OH)$, and $Al_2Cl(OH)_5$. A representative formula is: $Al_2Cl_{6-n}(OH)_n$, where n=2.7 to 5 for products formed via the process disclosed herein. It is thought that, when these products are diluted, polymeric species such as: $Al_{13}O_4(OH)_{24}(H_2O)12+7Cl$ are formed.

Basic Aluminum Chlorides: These are compounds having the formula: $Al_2(OH)_n(Cl)_{6-n}$ where n is greater than zero and less than or equal to 1.5. It is believed that solutions of these compounds contain: $Al(H_2O)_6+3Cl$; $Al_2(OH)_2(H_2O)_8+4Cl$; and $Al(OH)(H_2O)_5+2Cl$.

Aluminum Salt Concentration of Reaction Products: The concentration of aluminum salt stated as present in a reaction product refers to the amount of aluminum oxide that would have been necessary to make the product. Thus, products are described as having a certain percentage of $Al_2O_3$ even though the aluminum oxide may not actually be present in the product. This is common practice in the art and allows products to be compared based upon their chemistry.

Laser diffraction: Laser diffraction is a method of determining, among other things, surface area per unit of weight, using optical diffraction as described in ISO 13320:2009 "Particle Size Analysis—Laser Diffraction Methods".

Basicity: Aluminum chloride has the general chemical formula of $Al_n(OH)_mCl_{3n-m}$. Basicity is the ratio of $$\frac{m}{3n}$$

where m is less man or equal to 5.2.

The invention summarized above may be better understood by referring to the following description, the accompanying drawings, and the claims listed below. The description embodiments, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention.

Figure 1:
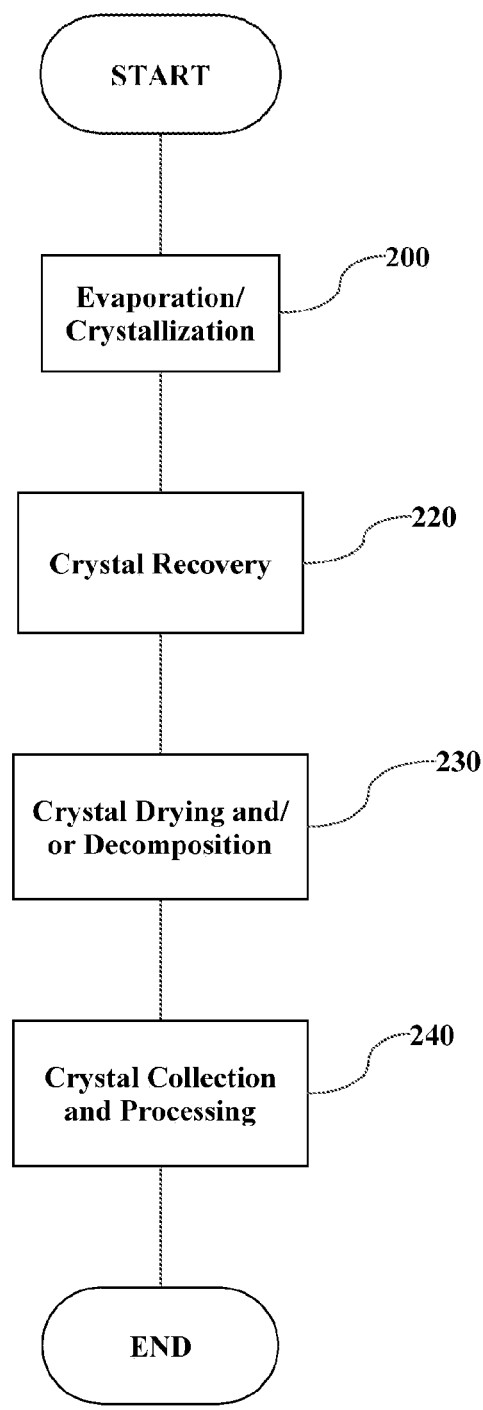
FIG. 1 is a flow diagram of a method for the production of aluminum chloride of various basicities in accordance with an embodiment of the present invention.

An optimized method for the production of aluminum chloride hexahydrate crystals is shown in the flow diagram of FIG. 1, and includes the following steps: (1) Evaporation/Crystallization 200, (2) Crystal recovery 220, (3) Crystal drying and/or decomposition 230, and (4) Crystal Collection and Processing 240.

(1) Evaporation/Crystallization 200:

Aluminum chloride hexahydrate crystals are created from an aluminum chloride solution, with evaporation of unwanted water with heat in the general range of 230-250 degrees Fahrenheit. One method of performing the evaporation/crystallization step 200 is in a batch system.

In an embodiment, a standard commercially available aluminum chloride solution at a concentration of 10.7% $Al_2O_3$ or 28.0% $Al_2Cl_6$ is charged to an agitated process tank. The solution is circulated through an external heat exchanger where process steam is used to raise the temperature of the solution to near boiling (between 230° F. and 235° F.). The heated liquid is drawn through a venturi and back into the process tank where vacuum from an induced draft fan causes localized boiling and evaporation of water from the system. The removal of water from the solution causes the concentration of aluminum chloride to increase to the saturation point of 12.4% $Al_2O_3$ or 32.4% $Al_2Cl_6$. When the solution concentration exceeds the saturation concentration, aluminum chloride hexahydrate (HEX) crystals begin to form. This process is continued until the volume of crystals in the recirculating solution exceeds 30 percent by volume.

Once the 30 percent by volume crystal concentration is reached, the steam flow is stopped and the solution is transferred into an agitated collection tank where it is cooled to between 160° F. and 180° F. to allow the crystals to mature and grow in size to nominally between 30 and 40 Tyler mesh. This step facilitates removal of the mother liquor from the crystals in the recovery step that feeds the crystal recovery step. The evaporator system is re-charged with aluminum chloride solution and the process is repeated.

(2) Crystal Recovery 220:

In the second step 220 of one preferred embodiment of the process, the aluminum chloride solution containing the HEX crystals is fed to a plate and frame filter where the crystals are separated from the solution. The solution is returned to the aluminum chloride storage tank that feeds the evaporator system. Once the filter chambers are full of crystal, the mother liquor contained in the cake is blown out of the crystal cake using compressed dry air at between 10 to 20 PSIG. The crystals are then discharged from the filter are collected in a feed hopper equipped with a variable rate feeder.

Figure 2:
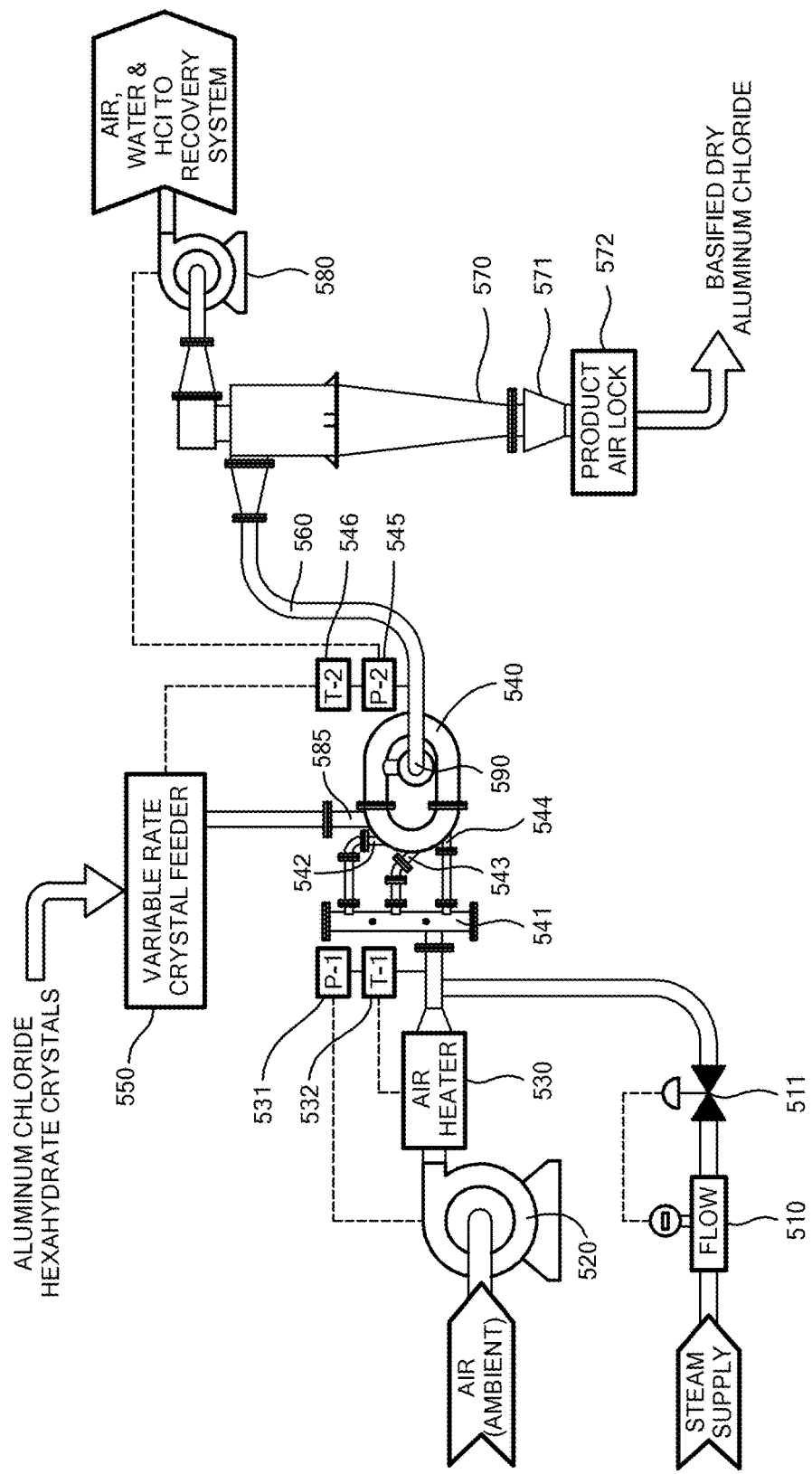
FIG. 2 is a schematic representation of a one embodiment of a system for the production of aluminum chloride hydrates of various basicities in accordance with the method of FIG. 1.

(3) Crystal Drying and/or Decomposition—230:

In a third step of the process 230, the variable rate feeder discharges de-agglomerated aggregates into a flash energy drying/grinding mill 540. The drying/grinding mill 540 is a circular tube. In some embodiments the tube is elongated as shown in FIG. 2, however, it is contemplated that other circular shapes may be utilized, but in all applications of this technology a system that applies centrifugal or gravitation forces to induce particle separation based on density is required.

The drying/grinding mill 540 has an intake 585 through which the HEX from step 2 is introduced. The feed rate is varied to maintain a constant exit temperature from the mill. This is important since basicity of the product is a time and temperature dependent reaction and is based on the amount of energy that can be absorbed by the HEX. Since the contact time inside the mill is short and consistent (5-10 seconds), maintaining the exit temperature of the mill 540 coupled with the gas supply temperature assists in producing the desired product.

Variations in free moisture of the feed to the mill affect the production rate of the product produced. As moisture increases, more energy is consumed to evaporate the moisture. With less energy present, the feed to the mill needs to be adjusted so that the ratio of dry HEX to energy absorbed is maintained to perform the decomposition reaction.

Because of the short residence time the feed is exposed to the thermal energy inside the mill, constant adjustments to the feed rate must be made to adjust for any variability of the feed stock, in order to maintain a constant exit temperature from the system. This is accomplished by use of a feedback control loop with the mill exit temperature 546 being the control variable, and the speed of the feeder 550 being the control element. Typical product basicity in association with the mill 540 exit temperature of each product is shown below in Table 1.

TABLE 1

Mill Operating Temperature Ranges for Various Products

| Product | Percent Basic | Temperature Operating Range* Degrees Fahrenheit |
|---|---|---|
| $Al_2Cl_6$ | 0 to 5 | 220 to 240 |
| $Al_2(OH)Cl_5$ | 14 to 18 | 260 to 280 |
| $Al_2(OH)_2Cl_4$ | 31 to 35 | 300 to 310 |
| $Al_2(OH)_3Cl_3$ | 48 to 52 | 340 to 350 |
| $Al_2(OH)_4Cl_2$ | 64 to 68 | 350 to 360 |
| $Al_2(OH)_5Cl$ | 81 to 85 | 380 to 400 |

*Dependent on gas supply temperature to mill

The energy is applied convectively in the mill and comes from heated air and/or superheated steam through tangential nozzle(s) 542, 543, 544. The addition of steam to the supply gas was found to increase the production rate. In an embodiment, a portion of the air can be replaced with a condensable gas to ease the volume of HCl-laden gas on the recovery system. In a preferred embodiment, however, steam is used. This mixture is supplied to the mill between 400° F. and 1,200° F. and produces velocities inside the mill of between 3000 and 6000 feet per minute.

As the particles of HEX dry and/or decompose, they lose bulk density due to the removal of water and HCl from the particle, making the crystal lattice more porous. It is this porosity on the surface of the particle that causes the internal portion of the particle to be insulated from the applied heat and thus resist decomposition. Collisions with other particles in the mill and impingement against the walls of the mill prevent the crystals from agglomerating as the particles circulate around the inside of the mill. Such collisions and movement also serve to scour finished product from the surface of the particles exposing wetter and/or less decomposed material to the energy in the system. Such exposure presents a distinct and unexpected advantage over prior known processes and makes the present process more beneficial over other known methods of manufacturing the desired products. Without this scouring and/or grinding in the mill, the outer surface of the particle will become over-decomposed, while the interior remains under-decomposed. Over-decomposed products become insoluble and thus useless products and/or produce highly viscous solutions that are difficult to use or perform poorly in product applications.

Decomposition processes as described here and in prior art will produce dilute acid solutions during production or when cleaning equipment. An important aspect of the products produced by the process described herein is that these products can be made at higher than 83% basicity. The high basicity product can be diluted with the above acidic solutions produced by decomposition, and still generate a liquid ACH with a basicity above 83%. To our knowledge, this is not possible with any prior known product, as material produced at an above average of 83% basicity will contain over-decomposed product in the exterior of the particle and under-decomposed material in the center. This will generate insoluble material that is extremely difficult to filter and result in loss of raw materials.

Figure 3:
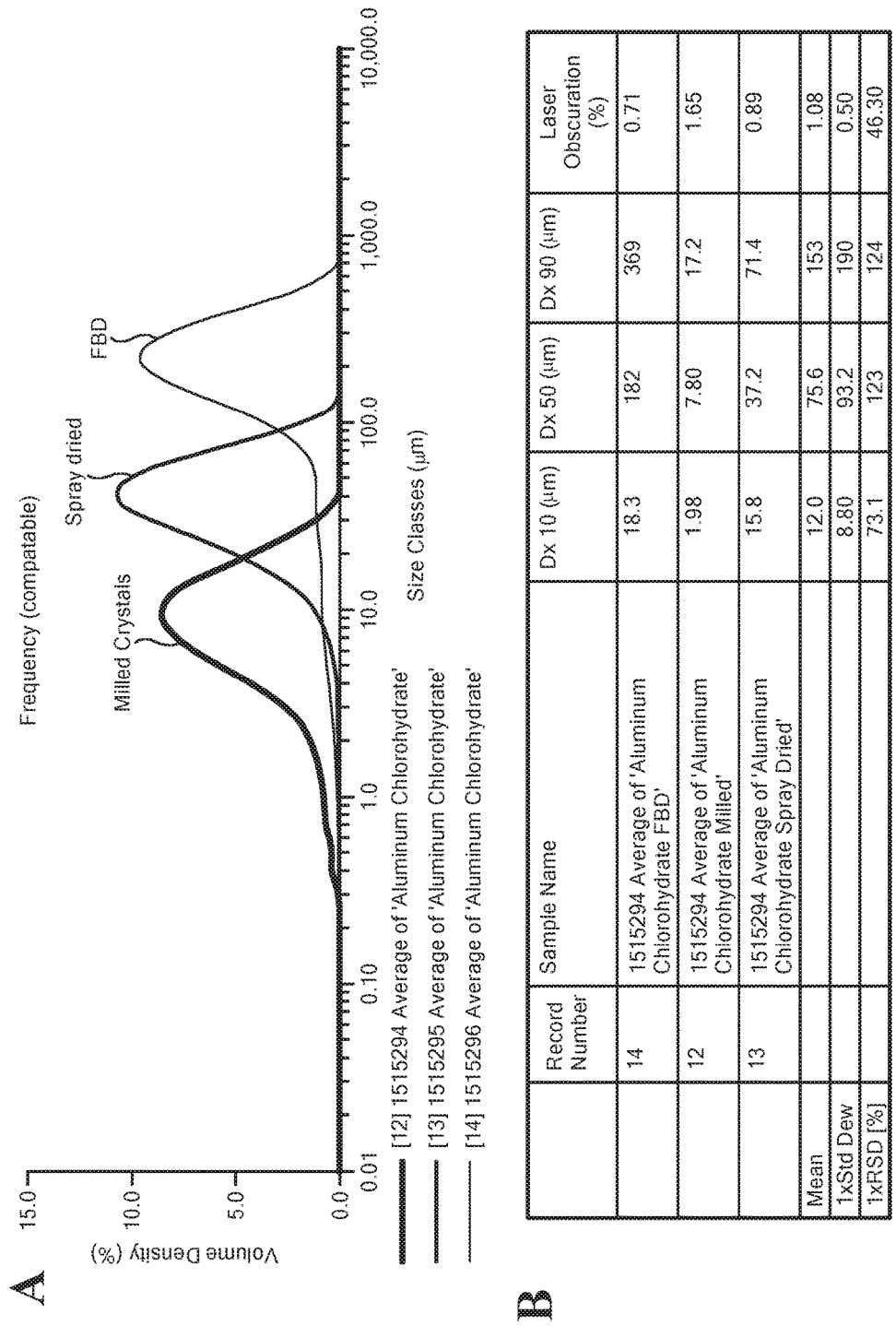
FIG. 3 is a graph (A) showing results of particle size distribution analysis of aluminum chloride particles produced by milling (first peak), spray drying (second peak), or using a fluid bed dryer (third peak). Also shown is a table (B) showing numerical values of the particle size distributions. The aluminum chloride particles produced by milling were produced in accordance with an embodiment of the present invention, and have a basicity of about 83%. The particles produced by spray drying were produced by prior art methods. Similarly the particles produced using a fluid bed dryer were produced by prior art methods.

Currently commercial products of dry ACH are made by reacting aluminum chloride, basic aluminum chloride or hydrochloric acid with metallic aluminum. This generates a 50% solution of ACH which is then spray dried. This is an energy intensive process for all the water must be evaporated and production of metallic aluminum is energy intensive as well. The product of this spray drying process is spherical crystals of aluminum chlorohydrate dihydrate of which 90 percent are less than 71 microns. See FIG. 3. Laser Light Diffraction has determined that these products have a specific surface area of less than 100 square meters per kilogram. The small specific surface area may be limiting in the usefulness of the product as a dry chemical reactant. The two waters of hydration also prohibit the use as a dry reactant in that the ACH dihydrate dissolves rapidly in cold water.

Figure 4:
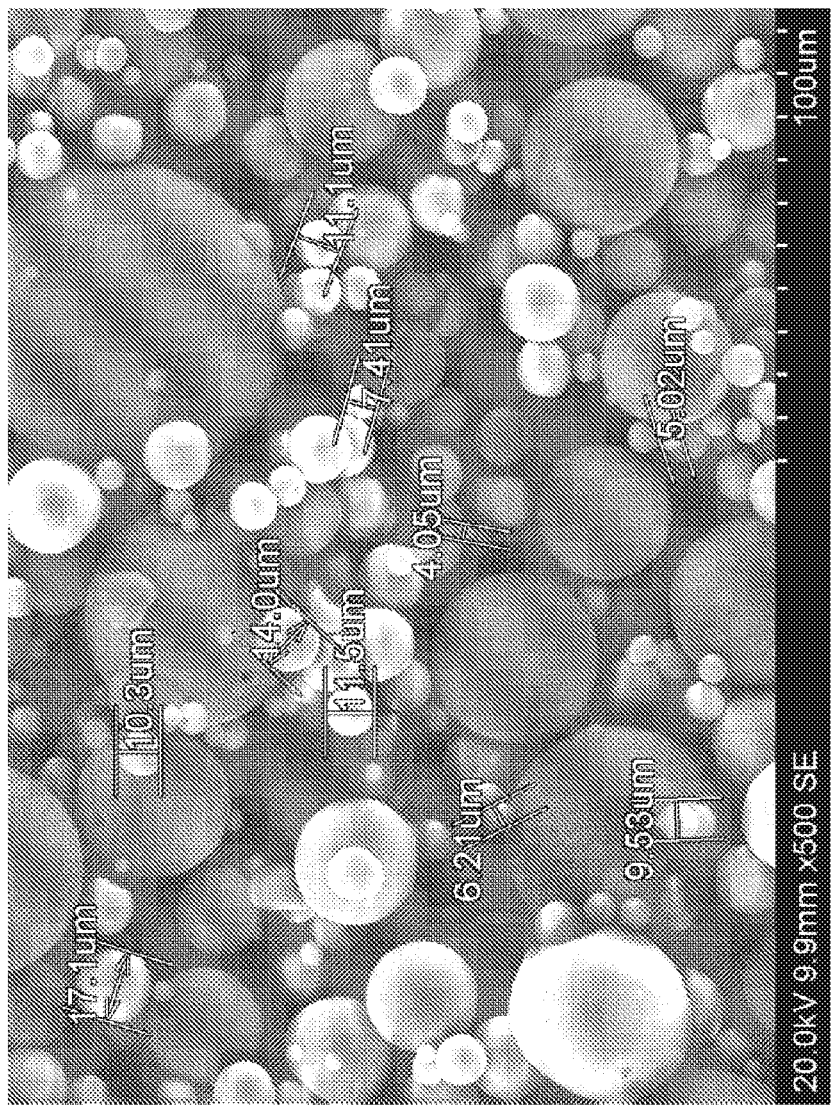
FIG. 4 shows results of scanning electron microscopy (SEM) of the prior art aluminum chloride particles produced by spray drying (which particles are also a subject of FIG. 3), the SEM picture including particle size markings.
Figure 5:
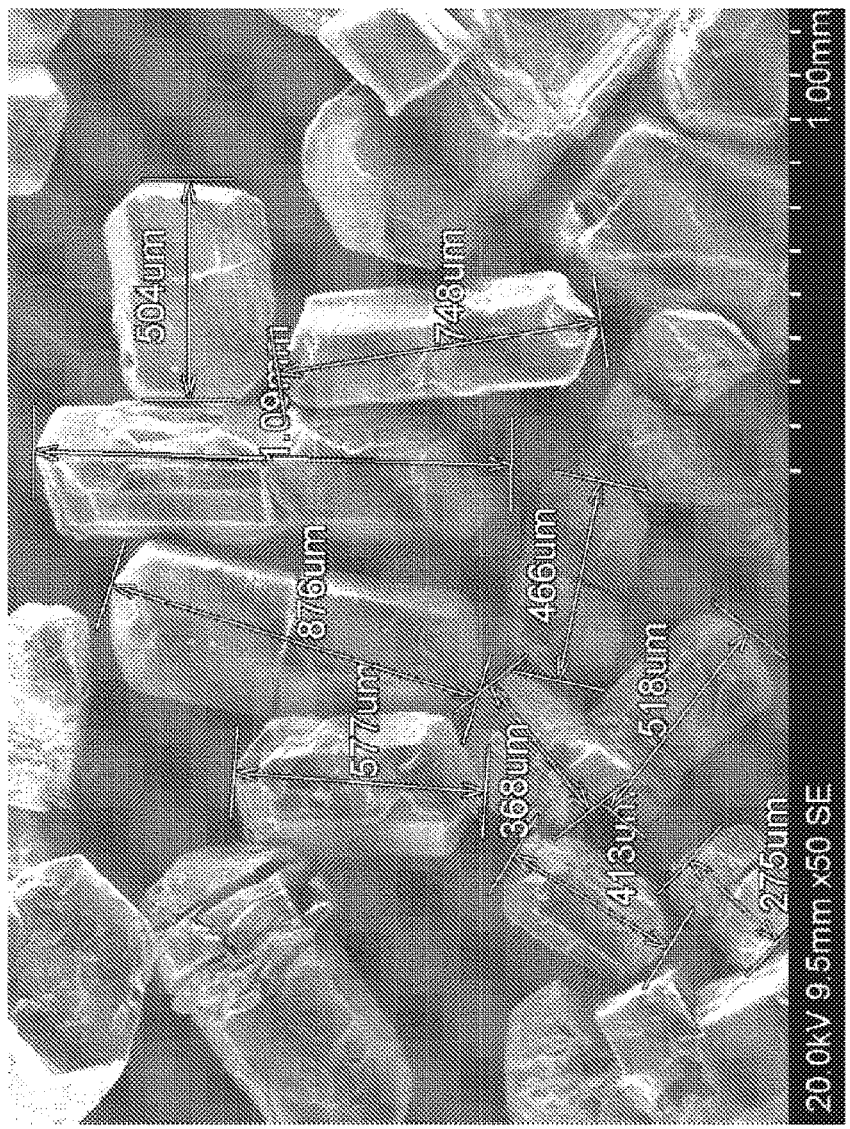
FIG. 5 shows results of scanning electron microscopy of the prior art aluminum chloride particles produced in a fluid bed dryer (FBD) (which particles are also a subject of FIG. 3), the SEM picture including particle size markings.

Products of the earlier Fluid Bed Dryer Technology also have small specific surface areas of less than 100 square meters per kilogram. They are long crystalline cylinders which 90 percent of the material is less than 369 microns. See FIG. 4. These products contain less than two waters of hydration but lack the specific surface area for good reactivity as dry reactant. The small surface area may cause longer reaction times which may be problematic in some reactions.

Figure 6:
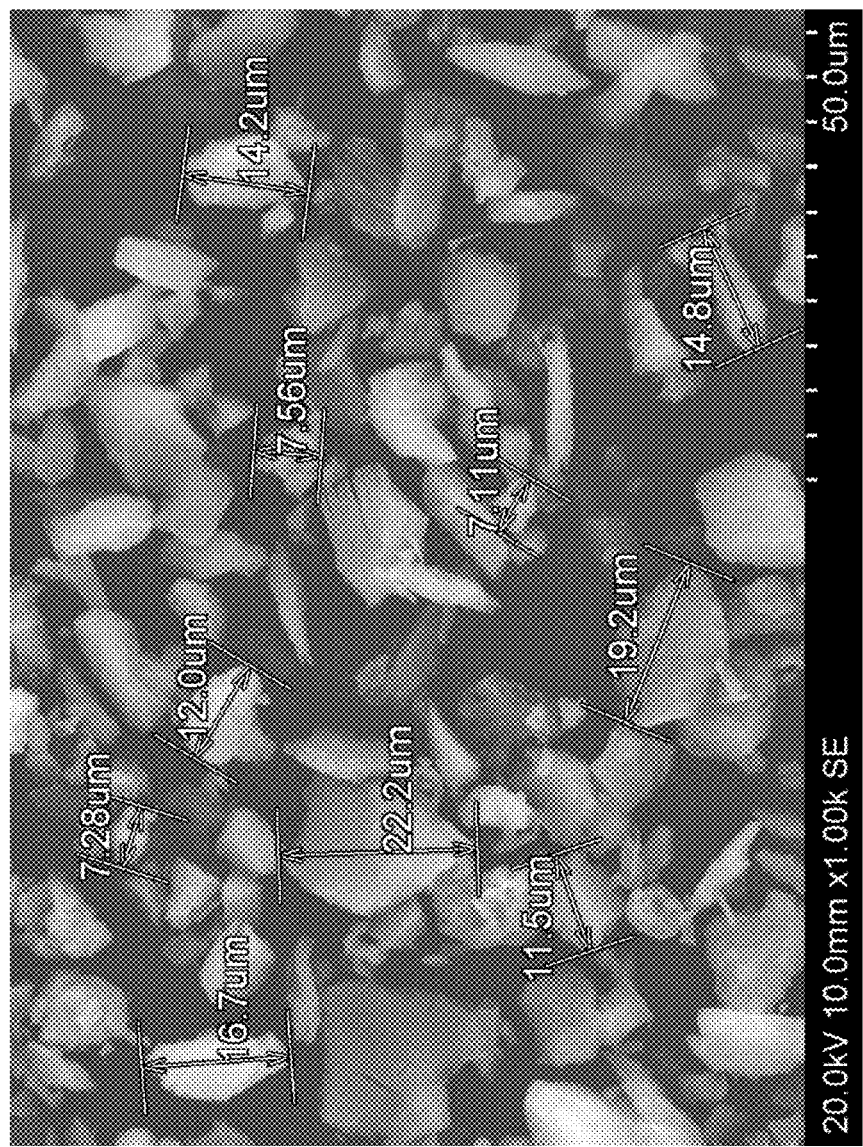
FIG. 6 shows results of scanning electron microscopy of the aluminum chloride particles produced by milling according to an embodiment of the present invention (which particles are also a subject of FIG. 3), the SEM picture including particle size markings.

The products of this invention are fractured crystals of which 90 percent are less than 17 microns. A specifically unique feature of these products is the large surface area of the particles formed. See FIG. 6. The specific surface area of these products, at 83% basicity, based on laser diffraction analysis, is in the range of about 575 to about 700 square meters per kilogram. Since more water and hydrochloric acid are released from the hexahydrate crystal as basicity increases, it can be demonstrated that the lower basicity products would have a smaller surface area than the higher basicity products. Table 2 below demonstrates what can be expected.

TABLE 2

% Basic Versus Surface Area

| Percent Basic | Operating Temperature ° F. | Surface Area (m²/kg) |
|---|---|---|
| 50% | 345 | 295 |
| 72% | 365 | 452 |
| 83% | 395 | 607 |
| 85% | 400 | 705 |

If appropriate conditions are not maintained, the average of the decompositions may be the desired value, but the standard deviation will be wide producing a product that may not have the desired properties or stability. The centrifugal forces inside the mill cause the material inside to separate based on particle density. The more dense material (wetter/less decomposed) will migrate to the outer radius of the mill and away from the mill discharge 590 and are retained longer, while the less dense (drier/more decomposed) travel towards the inner radius of the mill and exit the system through the mill discharge 590 as the desired product. The decomposition releases water and hydrogen chloride in gas form from the particles as they decompose.

Water of hydration is defined as water that is chemically combined with a substance to form a hydrate and can be expelled (as by heating) without essentially altering the composition of the substance. "Water of Hydration." Merriam-Webster.com. The waters of hydration will vary with the basicity of the product produced. Material of about 70% basicity have two waters of hydration ($Al_2(OH)_{4.20}Cl_{1.80} \cdot 2.0H_2O$), 83% basicity has about half a water of hydration ($Al_2(OH)_{4.98}Cl_{1.02} \cdot 0.5H_2O$), and the product becomes totally anhydrous at over 85% basicity ($Al_2(OH)_{5.10}Cl_{0.90} \cdot 0.0H_2O$). Commercially available ACH (83% basicity) has two waters of hydration ($Al_2(OH)_{4.98}Cl_{1.02} \cdot 2.0H_2O$).

(4) Crystal Collection and Processing.

In a final step 240 crystals of the appropriate basicity are collected and processed. The product exits from the mill discharge 590 and also contains hydrogen chloride and water in a gaseous form. Primary separation is performed by a cyclone separator 570. The discharged material from the cyclone will still contain hydrogen chloride gas and water vapor. Before these components have an opportunity to condense and be absorbed by the product they are stripped from the system by passing air through the product in a fluidized bed or by operating the cyclone under vacuum conditions. Once the product is separated from the gas stream it is conveyed to a storage bin. Once in the storage bin the product is either packaged as is or sent to additional processing to produce a liquid product.

One advantage over this process over previous designs with Fluid Bed Dryer (FBD) technology is the heavier bulk density of the product. The heavier bulk density allows for less storage bin space and will require less volume when shipped. The bulk density of ACH made from this process can range from 55 to 60 pounds per cubic foot while material from a FBD system can range 18 to 25 pounds per cubic foot.

SYSTEM COMPONENTS

In one embodiment, a system for the production of aluminum chlorides of various basicities is shown in FIG. 2. In the system, aluminum chloride hexahydrate crystals are put in a variable rate crystal feeder 550. The variable rate crystal feeder is connected to the grinding mill 540 by a conduit 501 that attaches to the mill's intake 585. Air, steam, or gas is supplied to the grinding mill 540. Ambient air is provided through an air supply blower 520 that is connected to an air heater 530. Steam is supplied through a steam supply source and a steam flow meter 510 measures the initial flow of steam into the system. Steam supply flow is controlled by a steam flow control valve 511. Steam or gas and ambient air are mixed and delivered to mixed gas supply header 541. Mixed air pressure and temperature are measured at the blower and heater through a mixed supply pressure meter 531 and a mixed gas supply temperature meter 532.

Mixed air is then divided into a number of mixed gas feed nozzles, 543, 543, 544. It is contemplated that the number of nozzles may vary depending on the size of the grinding mill 540. The product exits the mill 540 at the mill discharge 590 which connects to a product conveying line 560. Exit temperature and pressure are measured at the mill discharge 590 or product conveying line 560 by a grinding mill exit pressure meter 545 and a grinding mill exit temperature meter 546.

The product conveying line 560 delivers the product to the air/solid separating cyclone 570. The air/solid separating cyclone 570 is connected to a system induced draft fan 580. The system induced draft fan 580 assists in recovering excess air, water, and HCl. The air/solid separating cyclone 570 deposits dry aluminum chloride product to the product air lock 572 and the product can then be collected.

Commercially available ACH is made by elemental digestion of aluminum in HCl or aluminum chloride solutions. The dried product is then commonly made by spray drying ACH solutions, which is an expensive process. When using such a system, it is advantageous to process particles of less than 100 microns in order to prevent clogging of aerosol sprayers. The aluminum chlorohydrate products produced as described herein are produced in a manner that eliminates the expensive spray drying step, yet yields small particles with a high surface area and at desired basicity.

The embodiments of the invention described above are intended to be merely exemplary; numerous variations and modifications will be apparent to those skilled in the art. All such variations and modifications are intended to be within the scope of the present invention as defined in any appended claims.

The published patents and applications, and other published documents referenced in this description are hereby incorporated by reference in their entirety.

What is claimed is:

1. An aluminum chlorohydrate product comprising particles of aluminum chlorohydrate, in fractured crystal form, having a basicity in a range of about 50% to about 85.6%, a bulk density of 40 to 65 pounds per cubic foot, and a mean particle size in the range of about 10 microns to about 15 microns.

2. The aluminum chlorohydrate product of claim 1, wherein the particles have a specific surface area of 295 to 705 $m^2$/kg as measured by laser diffraction.

3. The aluminum chlorohydrate product of claim 2, wherein the basicity is about 83% and the specific surface area is in the range of about 575 to about 700 $m^2$/kg as measured by laser diffraction.

4. The aluminum chlorohydrate product of claim 1, wherein the basicity is about 85%.

5. The aluminum chlorohydrate product of claim 1, wherein the basicity is about 72%.

6. The aluminum chlorohydrate product of claim 1, wherein the basicity is about 50%.

7. The aluminum chlorohydrate product of claim 1, wherein the basicity is about 70% and the product has two waters of hydration.

8. The aluminum chlorohydrate product of claim 1, wherein the basicity is about 83% and the product has half a water of hydration.

* * * * *